March 12, 1957　　　S. O. WEEMPE　　　2,784,747
TRANSPORT TANK TRUCK
Filed July 11, 1955　　　3 Sheets-Sheet 1
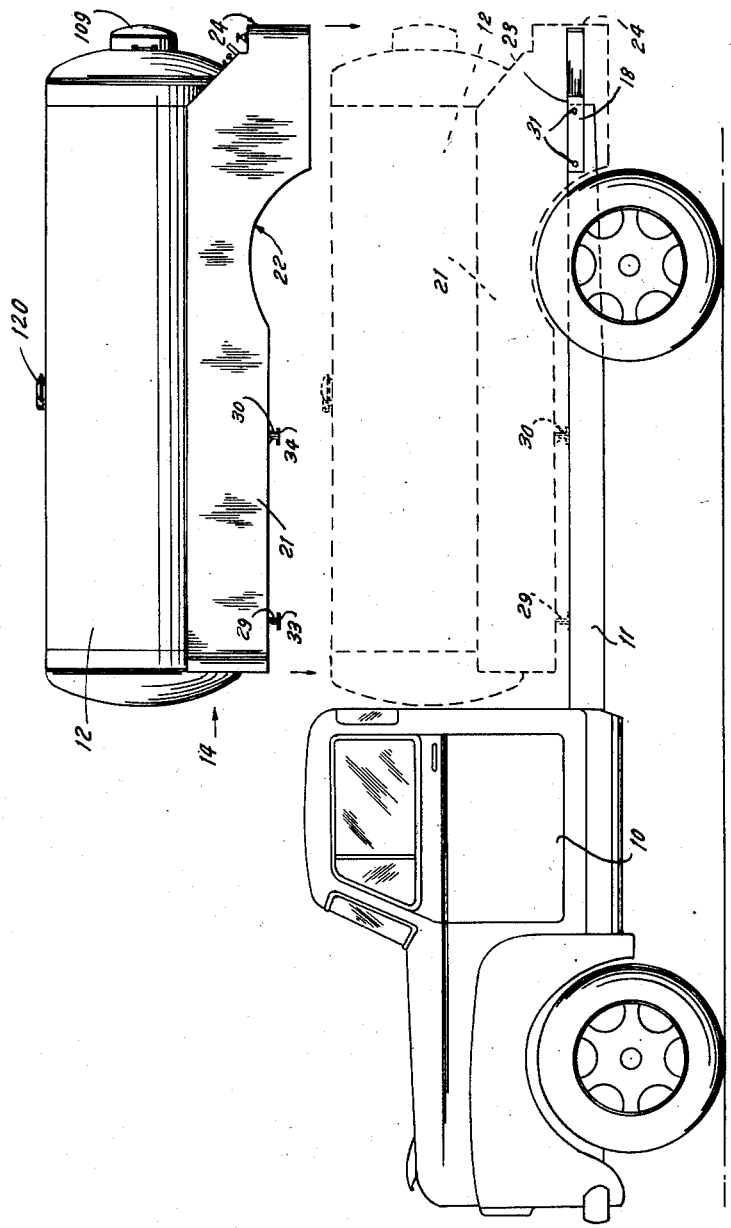
Fig. I
INVENTOR
Sam O. Weempe
BY
ATTORNEYS

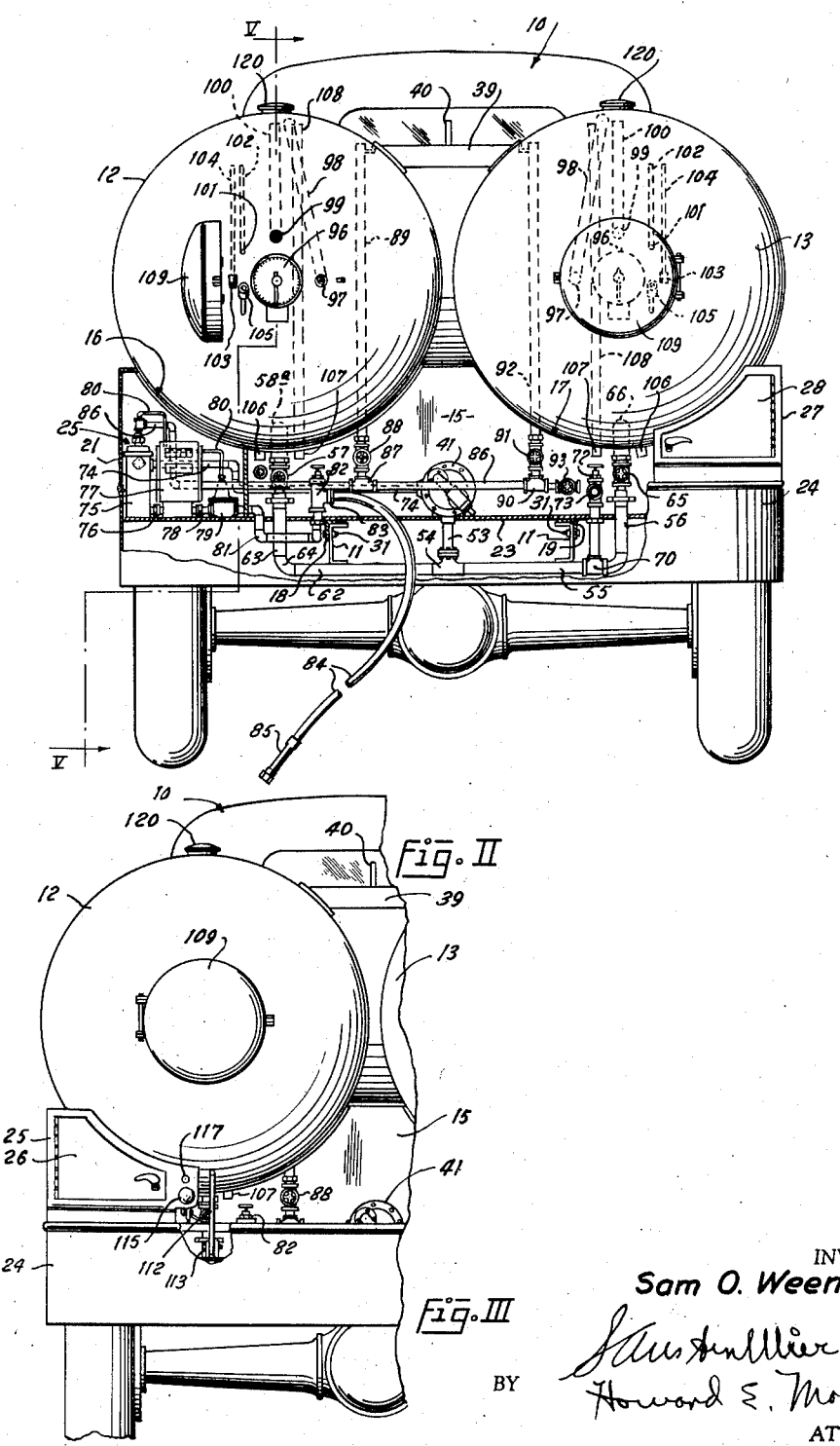

March 12, 1957 S. O. WEEMPE 2,784,747
TRANSPORT TANK TRUCK
Filed July 11, 1955 3 Sheets-Sheet 3
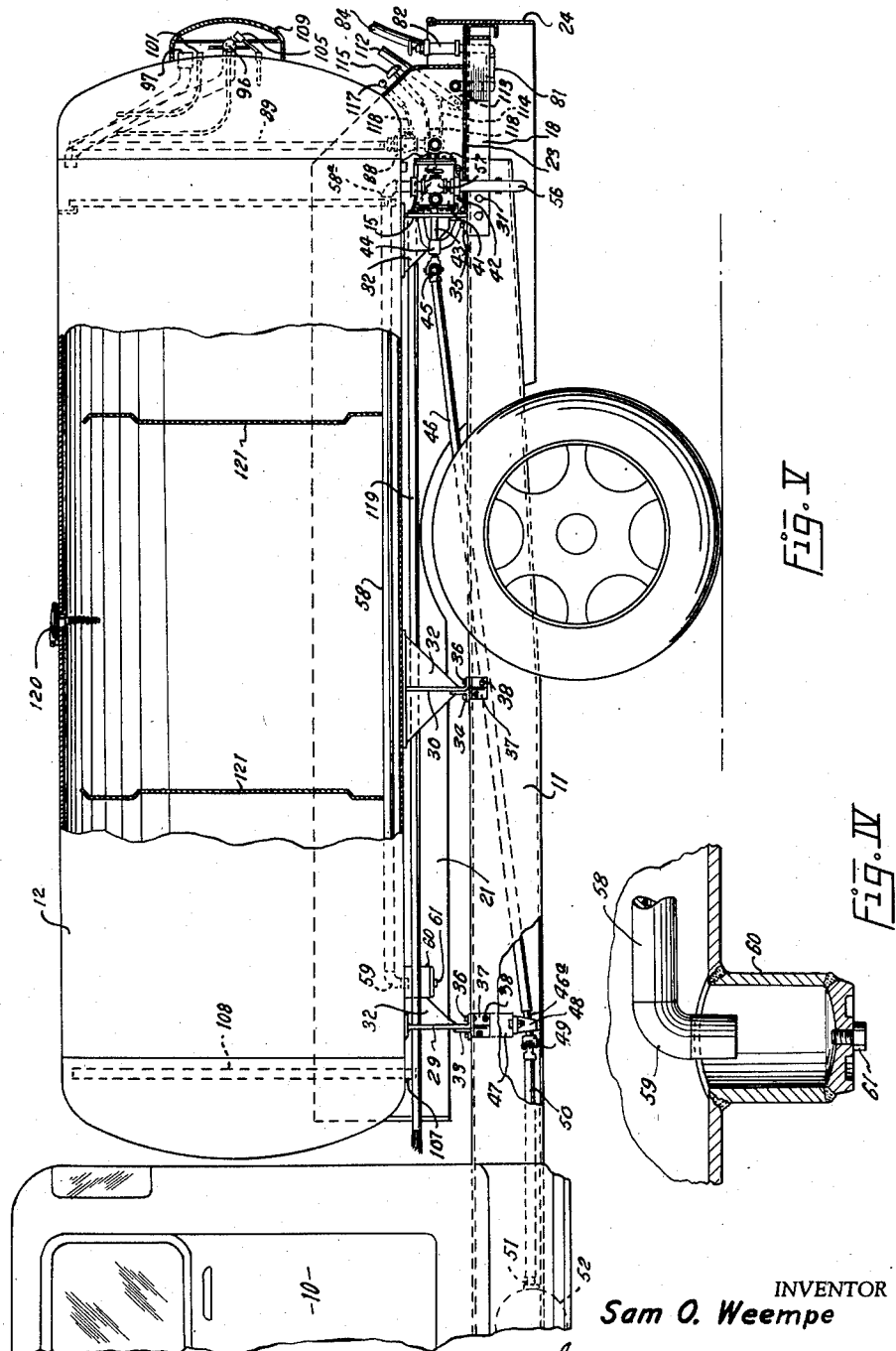
Fig. V
Fig. IV
INVENTOR
Sam O. Weempe
BY
ATTORNEYS ately my invention is concerned with a truck tank assembly used primarily for transporting volatile fuel such as butane, propane, and other liquefied petroleum gas, and is particularly concerned with a unitary frame and mounting for the tanks and appurtenant pipes and fittings which may be quickly and easily mounted and demounted from a standard truck body and which provides for maximum safety, economy and convenience in operation.

United States Patent Office 2,784,747
Patented Mar. 12, 1957

2,784,747

TRANSPORT TANK TRUCK

Sam O. Weempe, Dallas, Tex., assignor to Master Tank and Welding, Dallas, Tex., a partnership composed of Sam O. Weempe and Carl Casey Application July 11, 1955, Serial No. 521,144

4 Claims. (Cl. 141—21)

This invention is concerned with a truck tank assembly used primarily for transporting volatile fuel such as butane, propane, and other liquefied petroleum gas, and is particularly concerned with a unitary frame and mounting for the tanks and appurtenant pipes and fittings which may be quickly and easily mounted and demounted from a standard truck body and which provides for maximum safety, economy and convenience in operation.

In the past, transport tanks of this type have usually been mounted on a frame secured to the chassis of a truck in a manner which required the material alteration of the truck, the moving of the exhaust of the truck, and other expensive and time-consuming changes. The pump for delivery of fuel from the tank was usually mounted on the truck frame in front of the tanks and was connected to the tanks either by rigid pipe connections, extending from the pump to the tank, or by flexible rubber hose connections.

In either instance, such connections constituted a hazard, because the twisting, vibration and careening of the truck body placed a constant strain on such connections, which in many instances caused them to break. The flexible rubber hoses were also subject to rotting and bursting from excessive pressures.

The delivery outlets were usually placed in front of the tanks, where they were not easily accessible.

Such prior installations were unduly expensive and time-consuming, because when it was desired to change the tanks from one truck frame to another, it was necessary to modify the second truck to install the tank frame, pump and other fittings on the frame thereof. In addition to being expensive and time-consuming, such an installation was unsafe and inconvenient.

My invention is intended to obviate the above recited deficiencies of prior devices of this character and provides a unitary compact unit, having all fittings and connections for filling the tanks and for dispensing fuel therefrom at the rear of the truck where they are easily accessible.

The pump and all pipes, fittings, and other appurtenant parts are carried by a common frame, which also carries the tanks, and are rigidly mounted with relation thereto. The pipe joints can be welded because it is not necessary that they be flexible, thereby eliminating the danger of leaks and making for a strong, rigid mounting. The pipes and fittings are not affected by the flexing and twisting of the frame of the truck, and the danger of being twisted off and broken from such causes is eliminated.

The entire tank frame and appurtenant fittings and pipes carried thereby may be quickly and easily mounted to any standard truck frame by merely attaching the brackets carried by the tank frame to the side frames of the truck chassis, connecting the flexible drive shaft which drives the pump to the power take-off of the truck, and connecting the control cables which control the clutch, power take-off, and accelerator to the controls in the truck.

Likewise, the entire tank assembly, and fittings carried thereby, may be quickly and easily removed from the truck and placed on another truck as a complete unit without material alteration of the truck frame.

This may be done by merely disconnecting the drive shaft from the power take-off, removing the bolts which secure the tank frame brackets to the chassis of the truck and disconnecting the control cables for the clutch, power take-off and accelerator. The only alteration required in the truck chassis to mount the tank frame and fittings thereon is to drill sufficient holes therein to receive bolts to attach the mounting brackets of the tank frame.

A novel suction line extends from the rear of each tank, along the floor thereof, to the front of the tank and communicates with a sump at the lower front of the tank, so that the tanks may be completely evacuated of fuel.

As the fuel is removed from the tanks, the springs of the truck at the rear relax, thus raising the rear ends of the tanks. Since the controls and dispensing outlets are at the rear of the tank frame, in the absence of the suction lines extending to the front of the tank, a quantity of fuel would be left in the tanks. The suction lines permit evacuation of all fuel from the tanks, even though the rear ends of the tanks may be higher. The sumps are provided with drain plugs which may be removed to drain sediment which may collect in the sumps.

Heretofore, the underwriters have not seen fit to approve truck tanks of the types heretofore used because of the unsafe mounting described above, and because they were subject to alteration when changed from one truck to the other.

The present invention provides a unitary mounting, which can be manufactured and assembled as a unit at the factory and need not be altered in any respect to mount, therefore, for the first time providing a truck tank mounting which can meet the requirements of the underwriters.

It is therefore a primary object of this invention to provide a unitary truck tank assembly wherein the tanks and all fittings and connections for filling the tanks and dispensing the fuel therefrom are rigidly mounted on a common frame and wherein all fittings and controls are mounted at the rear of the frame where they are easily accessible.

Another important object of this invention is to provide such a unitary, compact truck tank assembly which may be mounted and dismounted from a truck chassis as a unit, with a minimum of alteration of the truck and chassis thereof, and with the greatest economy, savings in time, and safety.

A still further object is to provide such a tank mounting assembly wherein the joints of the appurtenant pipes and fittings may be welded and rigidly mounted on the tank frame to minimize the causes of leaks.

A still further object of this invention is to provide a tank mounting assembly having all fittings and pipes mounted at the rear of the tank frame with a suction line extending from the rear of the tanks to the front in communication with a sump at the lower side of the tanks to permit complete evacuation of the tanks of fuel, even though the front may be lower than the rear when the tanks are partially evacuated of fuel.

A general object of this invention is to provide a truck tank mounting assembly which is economical, safe and easy to operate.

Other and further objects of this invention will become apparent upon reading the detailed specification hereinafter following and by referring to the drawings annexed hereto.

In the drawings:

Fig. I is a side elevational view of a truck having my unitary tank mounting frame mounted thereon, illustrating the ease with which the tank mounting frame and all appurtenant fittings may be mounted on or demounted from a truck as a unit.

Fig. II is a rear elevational view of a truck showing the tank mounting frame, with appurtenant fittings carried thereby, mounted on the truck, the rear part of the tank frame and the meter housing being partially cut away to show the mounting of the pump, piping, valves and other appurtenant control devices mounted on the tank frame.

Fig. III is a fragmentary rear elevational view of a truck with the unitary tank frame mounted thereon, showing the controls for the clutch, accelerator and power take-off of the truck which are easily accessible from the rear of the truck.

Fig. IV is a fragmentary sectionalized elevational view of the sump incorporated as a part of each of the tanks, showing the suction line communicating therewith.

Fig. V is a fragmentary, partially sectionalized, side elevational view of the tank frame, and appurtenant fittings carried thereby, mounted on a truck chassis, showing the flexible drive shaft connected to the power take-off of the truck and the mounting for the control cables which control the clutch, accelerator and power take-off of the truck by means of controls mounted at the rear of the tank frame, said view being taken on line V—V of Fig. II.

Numeral references are employed to designate the various parts shown in the drawings, and like parts are indicated by like numerals throughout the various figures of the drawings.

The numeral 10 indicates a truck on which my transport tank assembly may be mounted. The assembly may be mounted on any standard truck. The truck 10 has a chassis which includes parallel spaced side frames 11, which are made a part of the truck at the factory. The tank frame is indicated generally at 14, which generally constitutes a cradle for supporting the conventional dual cylindrical transport tanks 12 and 13.

The tanks 12 and 13 are made of heavy steel plate and are suitably fabricated to conform with governmental regulations pertaining to the storage and transporting of volatile liquids, such as liquefied petroleum gas.

One of the tanks 12 and 13 may be used to transport one type of liquefied petroleum gas, and the other may be used to transport another type of liquefield petroleum gas, or both may be employed to transport the same type of liquefied petroleum gas.

As is well known, liquefied petroleum gas is highly volatile, and combustible, and creates extreme pressures when confined. Therefore, it is necessary that all tanks, valves, fittings and pipes be carefully fabricated, and of strong material, and that all joints be carefully sealed to prevent leakage. Safety is an important feature of the present invention.

The general tank supporting frame 14 includes a downwardly extending cradle plate 15 near the rear end thereof, in which is formed the semicircular cut-out portions 16 and 17 adapted to receive the tanks 12 and 13. The tanks are securely welded to the cradle 15, about the inner sides of the cut-out portions 16 and 17.

Side skirts 21 are provided as an integral part of the tank frame on each side thereof, such side skirts having cut-out portions 22 at each side thereof adjacent the rear wheels of the truck to permit easy access to the wheels for inflating and changing tires, etc.

The skirts 21 extend rearwardly of the tanks 12 and 13, and a transverse platform 23 is formed as a part thereof which extends between the skirts 21 below the tanks.

The various controls and fittings, to be hereinafter described, are mounted on the platform 23 in position to permit easy access thereto.

A pair of spaced, longitudinally extending, angle plates 18 and 19 are welded to the underside of the platform 23. The angle plates 18 and 19 overlap the frames 11 of the truck chassis and are detachably secured thereto by bolts, such as indicated at 31.

An upwardly extending rear wall 24, which is a continuation of the skirts 21, is provided about the rear side of the platform 23 in position to enclose and protect the appurtenant fittings and pipes mounted above and below the platform.

At one side of the platform 23 is provided a meter housing 25, which has a hinged door 26 thereon to permit access to the meter and other devices mounted in the meter housing. On the other side of the platform 23 is provided a tool box 27 of the same construction as the meter housing 25, such tool box having a hinged door 28 thereon to permit access thereto. The meter housing and tool box form an integral part of the general tank frame 14.

A plurality of transverse mounting cradle plates 29 and 30, which are the same in construction as the cradle plate 15, are affixed to the lower sides of the tanks 12 and 13 and to the skirts 21 at each side of the tank frame. The mounting plates 29, 30 and 15 are heavy steel plates which extend underneath the tanks and the upper sides thereof are cut away, as shown at 16 and 17, to conform to the shapes of the tanks, and the plates are welded to the tanks about the cut-outs. The mounting plates are reinforced by gussets, indicated at 32, which are welded to the tanks and to the mounting plates.

The mounting plates 29, 30 and 15 have oppositely turned right angular flanges 33, 34 and 35, respectively, provided thereon, such flanges having bolt receiving holes (not shown) therethrough which receive bolts, such as those indicated at 36, which bolts pass through suitable holes (not shown) in the side frame 11 of the truck, to thereby detachably mount the tank frame to the truck. The mounting may be made more secure by means of face lugs 37 welded to the flanges 33, 34 and 35, which are secured to the sides of the truck side frames 11 by means of suitable bolts 38.

It will be apparent that the entire tank frame 14 may be quickly mounted to the truck by merely attaching the mounting plates 29, 30 and 15 and the angle plates 18 and 19 to the side frames 11, in the manner indicated, and may also be quickly detached from the truck.

A plurality of reinforcing plates 39 are welded between the tanks 12 and 13 at the upper sides thereof and an eye 40 extends upwardly from the middle plate 39 to which a suitable lifting device, such as a cable with a hook thereon, may be attached for the purpose of lifting the tank frame onto the truck chassis or for removing it therefrom.

The tank frame, with all fittings carried thereon, may be placed on the truck chassis as an integral unit in the manner indicated at Fig. I, or it may be removed therefrom as a unit.

A conventional rotary pump 41 is mounted on the patform 23 by means of suitable bolts 42. The noise of the pump extends through the rear cradle plate 15, and the drive shaft 43 of the pump extends through and is rotatably carried by a bearing 44 carried by the pump frame.

The outer end of the drive shaft 43 is connected to a tubular driven shaft 46 by means of a universal joint 45. The driven shaft 46 extends underneath the tank frame, longitudinally thereof, and the outer end thereof is connected to a bearing shaft 46a which rotatably extends through a bearing in the bearing block 48. The bearing block 48 is secured to the mounting plate 29 by means of an extension bracket 47 in proper alignment with the driven shaft 46. The outer end of the bearing shaft 46a is attached to a connecting link 50 by means of a universal joint 49. The other end of the connecting link 50 is detachably attached to the auxiliary power take-off drive shaft 51, which extends from the transmission 52 of the truck. The drive shaft assembly described above is provided as part of the truck tank assembly.

When mounting the truck tank assembly on the chassis of the truck, it may be connected to the power take-off of the truck by one simple connection, that being the connection of the connecting link 50 to the power take-off shaft 51. In some instances it may be necessary to substitute a connecting link 50 of different length to conform it to the different positions of the power take-off of the truck. This may be easily done.

It will be apparent that when the power take-off shaft 51 is rotated by conventional controls, made a part of the truck, the driven shaft 46 will be rotated, thus rotating the pump 41.

A pump intake line 53 communicates with the pump 41, such intake line being connected in communication with the transfer lines 55 and 62, which in turn communicate with the tanks 12 and 13 through the T-connection 54.

A T-connection 70 is connected between the transfer line 55 and a riser pipe 56 extending through the platform 23.

A riser pipe 63 is connected to the transfer pipe 62 by means of an elbow joint 64. The riser pipe 63 extends through the platform 23.

A conventional Globe valve 57 is attached at the upper end of the riser pipe 63, and an elbow joint 58a connects the valve 57 with a suction line 58 which extends longitudinally along the inner side of the floor of the tank 12. Thus, the suction pipe 58 may communicate with the pump 41 through the valve 57.

There is connected at the outer end of the suction line 58 an elbow intake nipple 59, the open end of which extends into the substantially cup-shaped sump 60, which is welded below the tank 12 or 13, as the case may be. The construction of the sump and the mounting thereof is shown in detail in Fig. IV.

A drain plug 61 is threadedly engaged in the lower end of the sump 60. The drain plug 61 may be removed for the purpose of draining out sediment which may collect in the sump, if desired.

When the tanks 12 and 13 are filled with liquid fuel, the weight thereof presses the springs down at the rear of the truck; and as liquid is dispensed from the tanks, the springs relax, thus raising the rear ends of the tanks, causing the front ends of the tanks to be lower. Where the dispensing outlets are arranged at the rear of the tank frame, as is disclosed herein, it would be impossible to drain all of the fuel from the tanks without the suction lines 58 extending to the front of the tanks. The suction lines 58, in cooperation with the sump 60, permits all of the fuel in the tanks to be evacuated therefrom, even though the front end of the tanks may be lower. This is a matter of considerable importance in my invention, because it makes possible complete drainage of the tanks, and at the same time permits the mounting of the controls and dispensing outlets at the rear of the tank frame where they are easily accessible.

Heretofore, it was thought necessary to place the dispensing outlets at the front of the tanks in order to completely drain the tanks of fuel.

A Globe valve 65 is connected to the upper end of the riser pipe 56, and such valve is in turn connected to a suction line (not shown) by means of an elbow joint 66, which suction line extends longitudinally along the floor of the tank 13 exactly in the same manner as was described in connection with the suction line 58 in tank 12. The suction line in tank 13 also communicates with a sump exactly like that shown at 60, which is mounted in exactly the same way, and performs the same functions as was described in connection with the suction line 58 and sump 60 hereinbefore.

The T-coupling 70 communicates with a riser pipe 71 which extends upwardly through the floor 23. A conventional Globe valve 73 is attached to the upper end of the riser pipe 71. An outlet connection 73 is provided on the valve 72 to which connection a hose (not shown) may be detachably connected for the purpose of attaching to an outside container for liquid so that liquid may be drawn from the outside tank through the valve 72 by the pump 41 and transferred to one of the tanks 12 or 13. By use of this auxiliary connection the tanks 12 and 13 may be filled from an outside source by the pump 41, or such connection may be used to evacuate a customer's tank of fuel and transfer it to the truck tanks. The connection 73 and valve 72 may also be used for transferring fuel from one outside tank to another outside tank, as will be explained hereinafter.

The pump discharge line 74 is extended through suitable joints to connect with the upper end of a vapor release device 75, which is of conventional construction. The vapor release device 75 is mounted to the floor 23, inside the meter housing 25. The vapor release device 75 allows vapor to rise upwardly through the connections extending from the top thereof and the liquid passes downwardly therethrough to pass through a liquid line 76 leading from the lower side thereof. The liquid line 76 is connected to communicate with the standard liquid meter 77. The liquid passes through the meter and is measured thereby. An outlet conduit 78 is connected to the other side of the meter, between the meter and the pressure differential valve 79, which protects the meter. A vapor line 80 extends from the pressure differential valve 79 and is connected to communicate with the vapor return line 86.

The liquid discharge line 81 extends from the pressure differential valve, by suitable elbow joints, underneath the floor 23 and upwardly therethrough to connect with a Globe valve 82 which has a hose connection 83 thereon. The flexible filler hose 84 may be detachably connected to the hose connection 83 in the usual manner. The filler hose 84 has a conventional screw connection 85 on the outer end thereof which may be connected to the filler valve (not shown) on a tank to which liquid is to be transferred from the transport tanks 12 or 13 on the truck. The hose 84 is usually attached only when in use and may be stored on a reel (not shown) on the tank frame.

A vapor return line 86 is connected, by a suitable T-connection, with the upper end of the vapor release device 75. The vapor return line 86 is extended to connect to a T-connection 87 which in turn is connected to a Globe valve 88. The Globe valve 88' is connected to a vapor discharge pipe 89 which extends upwardly through the tank 12 and discharges near the upper end thereof. The vapor return line 86 is further extended to connect to a T-connection 90, which in turn is connected to a Globe valve 91 which is connected to, and communicates with, the vapor discharge pipe 92, extending upwardly in the tank 13, to discharge near the upper side thereof.

A hand operated valve 93 is connected at one side of the T-connection 90 and is arranged to communicate with the vapor return line 86. The valve 93 may be connected to a hose (not shown) extending to an outside storage container for the purpose of returning vapor thereto when fuel is being withdrawn from such container to fill the tanks 12 and 13 through the auxiliary filler connection 73, or such arrangement may be used to return vapor to a tank from which fluid is being transferred to another outside tank. It is well known in the art that when liquefied petroleum gas is being transferred from one container to another, equalization of pressure in the two containers permits quicker transfer of liquid.

There is mounted on the rear end of each of the tanks 12 and 13, in a position to be easily accessible, various gauges and connections which are necessary in the filling and dispensing from the tanks 12 and 13.

These fittings include a rotary liquid level gauge 96.

A spray filler 97, through which the tanks may be filled, communicates with a pipe 98 extending upwardly in the tanks. The spray filler permits quicker filling. The expansion of the gas when released in the tank acts as a refrigerant which lowers the pressure in the tank permitting quicker transfer of fuel. A vapor return connection 99 is provided in communication with a pipe 100, inside each tank. A hose (not shown) may be connected to the vapor return connection 99 and to an outside tank to which fuel is being dispensed from the truck tanks to return vapor from the outside tank to the truck tanks.

A conventional outage gauge 101 is mounted on each of the tanks and communicates with a pipe 102, extending upwardly inside the tanks.

A pressure gauge 103 is carried on the outer end of each of the tanks and communicates with a riser pipe 104 inside each tank. A temperature indicator 105 is connected to communicate with the inner side of each tank. A hinged door 109 is provided on the rear side of each tank which may be closed to protect the various gauges and valves, described above.

A valved connection 106 is provided on the lower side of each of the tanks to which may be connected a suitable hose to extend to the carburetor of the truck to withdraw liquid from the tank for use of the truck, in the event the truck is one which operates on liquefied petroleum gas, and if such be desired.

A vapor connection 107 is also provided to communicate with each of the tanks 12 and 13 and is connected to a riser pipe 108 extending upwardly to a point near the upper side of the tank. The connection 107 may be connected through a suitable hose to the carburetor of the truck to supply vapor thereto for starting the truck, in the event it is desired to supply liquefied petroleum gas to the engine of the truck for operation. The connections 106 and 107 are merely provided for the convenience of those customers who have use therefor.

A clutch control lever 112 is pivotally mounted to a bracket 113 which is secured to the upper side of the floor 23. A control cable 114 is attached to the lever 112. The other end of control cable 114 may be connected to the clutch control (not shown) in the truck, which controls the transmission of the truck.

A power take-off pull type control knob 115 is mounted to the outer wall of the meter housing 25 and is attached to a flexible cable 116 which extends to the power take-off control (not shown) in the truck.

An accelerator pull type control knob 117 is also attached to the outer wall of the meter housing 25, and a control cable 118 extends from the control knob 117 to the accelerator (not shown) in the truck.

The flexible cables 114, 116 and 118 extend through, and are supported by, a metal tube 119 which extends longitudinally underneath the tanks 12 and 13 and pass through the cradle plates 29, 30 and 15 to which the tube 119 is secured, as by welding.

The clutch, power take-off and accelerator in the truck may be controlled by the lever 112, and knobs 115 and 117 from the rear of the truck, thus providing for actuation and control of the pump 41 from the rear of the truck. The control cables 114, 116 and 118 may be quickly attached to the truck or detached therefrom, as the case may be, when the tank frame is mounted on the truck or removed therefrom.

On the upper side of each of the tanks 12 and 13 is provided a pressure relief valve 120, which is of conventional construction, to allow the release of excessive pressure in the tanks.

Each of the tanks 12 and 13 also has a pair of transverse baffles 121 therein to prevent undue sloshing of fuel.

It will be observed that all pipes and fittings forming a part of the assembly for the transfer of fuel to and from the tanks 12 and 13 are mounted on one frame which is separate from the chassis or frame of the truck; and they are all mounted in a position where they are easily accessible from the rear of the truck. The pipes and fittings are not subject to twisting and strain, so that they can be rigidly mounted, as by welding, to the frame, and all pipe joints, other than those which must be detached, may be welded to give added protection against leaks. This is an important consideration in a device of this character where highly volatile fuel is handled. All fittings, pipes and appurtenant fixtures are mounted on a single frame so that they may be permanently mounted, and the entire frame with the fittings thereon may be mounted and demounted as a unit.

Fuel may be dispensed from either of the tanks 12 or 13 separately, or from both at the same time. For instance, if it is desired to dispense fuel from the tank 12 to a customer's tank, the hose 84 is connected to the valve 82, and valve 65 is left closed and valve 57 is opened.

Valves 72 and 93 normally remain closed and are opened only for special purposes, as will be explained.

The hose connection 85 is connected to the customer's tank. Valve 82 is opened. The engine of the truck is started and the power take-off is actuated to turn the driven shaft 46, thereby rotating the impeller in the pump 41. The pump draws fluid from the tank 12 through the suction line 58, through transfer line 62, and discharges it through pump outlet 74, through vapor release device 75, pressure differential valve 79, liquid discharge line 81, open valve 82, and through hose 84 to the customer's tank. A vapor return line is connected between the customer's tank and the vapor return connection 99.

In like manner, fluid may be drawn from tank 13 and dispensed to a customer's tank through the hose 84 by closing valve 57 and opening valve 65, thereby drawing fluid from tank 13 through suction line 58, through the pump 41, vapor release device 75, meter 77, valve 82 and discharge hose 84.

Vapor separated in the vapor release device 75 is returned to whichever tank is being dispensed from, through an open valve 88 or 91, as the case may be, the other valve being closed.

In the event it is desired to use the pump 41 to transfer fuel from one outside tank to another outside tank, the valves 65 and 57 are closed, and vapor return valves 88 and 91 are closed. A hose is connected between connection 73 and the tank from which fuel is to be drawn. The hose 84 is connected to another tank to which fuel is to be transferred, and valve 82 is opened. A hose is connected between the vapor return valve 93 and the tank from which fuel is being withdrawn. The valve 72 is opened. The pump 41 is started, which draws fuel from the dispensing tank through valve 72, line 71, line 55, line 53 and discharges it through line 74, through vapor release device 75, meter 77, pressure differential valve 79, line 81, valve 82, and is dispensed through hose 84 to the tank which is being filled. Vapor is returned to the tank from which fuel is being drawn through vapor return line 86 and open valve 93 through a hose (not shown) connected between valve 93 and a vapor return connection on the tank.

Fuel may be drawn from an outside tank and deposited in one of the tanks 12 or 13 by connecting the outside tank through a hose to the valve 72.

By way of illustration, if it is desired to fill the tank 13 from an outside tank, the valve 57 is closed and valve 65 is opened. The hose 84 is connected to the filler connection 97. A hose is connected between the valve 93 and the tank from which the fuel is being drawn to provide for vapor return. The pump 41 is started and fuel is drawn from the outside tank through the pump 41, vapor release device 75, meter 77 and through open valve 82 and hose 84 to the tank 13.

In each instance, the fuel passes through the meter and is registered.

Fuel may likewise be withdrawn from the outside tank and deposited in tank 12 by changing the connection of the hose 84 to the filler connection 97 on tank 12, and closing valve 65 and opening valve 57.

Thus, the assembly herein described may be used to fill the truck tanks, dispense from the tanks and transfer fuel from an outside tank to another outside tank, all with a single pump.

It may also be used to fill both of tanks 12 and 13 by an outside pump. This may be done by connecting the outside pump to connection 73 and opening valve 72 and valve 65 or 57, or both of the last two named valves, if it is desired to fill both tanks at once.

As explained hereinabove, the truck tank assembly may be mounted by merely attaching the cradle plates 29, 30 and 15 and angle plates 16 and 17 to the side frames 11 of the truck by simple bolt connections, and the drive shaft for the pump may be quickly attached to the truck by a simple connection to the power take-off shaft on the truck, and the control cables may also be quickly attached to controls on the truck.

No alteration is required in the truck to mount the truck tank assembly, other than the drilling of holes in the side frames on which the cradle plates 29, 30 and 15, and angle plates 16 and 17 are mounted.

It is not necessary to move the exhaust on the truck, as was previously the practice, because all dispensing and filling connections are at the rear of the tank frame and isolated from the exhaust.

The truck tank assembly may be made at the factory in one complete unit, thus providing for standardization, the welding of joints, and a complete inspection, insuring safety. It can be made under proper controls to be approved by the underwriters, and after being fabricated there is no necessity for alterations to be made therein for mounting on any standard truck chassis.

It will be apparent that other and further modifications of this invention may be made without departing from the spirit and scope of the appended claims.

I claim:

1. In a unitary truck tank assembly, a tank frame arranged for detachable connection to the chassis of a truck; a plurality of tanks on said frame; a platform extending rearwardly of the frame; a pump mounted on the platform; valved conduits communicating with each tank and with the intake conduit to the pump; a liquid meter mounted on the platform; an outlet conduit for the pump communicating with the meter; a valved fuel dispensing connection communicating with the meter and being arranged for connection to a fuel container to be filled; vapor return connections carried at the rear of the frame and arranged for connection to said fuel container; and an auxiliary valved connection communicating with the dispensing conduits for the tanks and arranged for connection to an outside container whereby fuel may be transferred from an outside container selectively to the tanks by the said pump.

2. In a liquefied petroleum gas transport truck, a unitary frame including a plurality of transversely disposed saddle mounts forming a part of the frame; at least one transport tank secured to the saddles; a platform extending rearwardly of the frame and made a part thereof; valved conduits carried by the platform communicating with the tank; a pump carried by the platform in communication with the valved conduits for filling and dispensing from the said tank; and inlet and outlet connections communicating with the conduits for dispensing fuel from the tank and for returning vapor from the tank to an outside container; and means to detachably mount the saddle mounts on the chassis of a truck.

3. In a liquefied petroleum gas transport truck, a unitary frame including a plurality of transversely disposed saddle mounts forming a part of the frame; a pair of transport tanks secured to the saddles; a platform extending rearwardly of the frame and made a part thereof; valved conduits carried by the platform communicating with the tanks; a pump carried by the platform in communication with the valved conduits for filling and dispensing from the said tanks; inlet and outlet connections communicating with the conduits and with the pump for selectively dispensing fuel from the tanks and for returning vapor from the tank to an outside container; means to detachably mount the saddle mounts on the chassis of a truck; and clutch, power take-off, and accelerator controls carried by the platform and having connections extending therefrom arranged for detachable connection to the clutch, power take-off, and accelerator of a truck on which the frame is mounted.

4. In a truck tank frame; a platform extending rearwardly thereof; a rotary pump mounted on the platform; and a drive shaft rotatably suspended to the frame and operatively connected to the pump and extending underneath the frame to a position to be connected to the auxiliary power take-off of a truck on which the frame may be mounted.

References Cited in the file of this patent

UNITED STATES PATENTS

| 349,528 | Shaw | Sept. 21, 1886 |
| 1,390,045 | Kramer | Sept. 6, 1921 |
| 1,472,078 | Lucius | Oct. 30, 1923 |
| 1,696,954 | Hays | Jan. 1, 1929 |
| 1,727,207 | Kramer | Sept. 3, 1929 |
| 1,815,625 | Kramer | July 21, 1931 |
| 1,897,164 | Endacott | Feb. 14, 1933 |
| 2,056,828 | Clawson | Oct. 6, 1936 |
| 2,208,621 | Ball et al. | July 23, 1940 |
| 2,506,911 | Ziegler | May 9, 1950 |
| 2,632,577 | Sacco | Mar. 24, 1953 |

FOREIGN PATENTS

| 444,783 | Germany | May 30, 1927 |